United States Patent
Ai (10) Patent No.: US 10,827,458 B2
(45) Date of Patent: Nov. 3, 2020

(54) PAGING METHOD, MOBILE MANAGEMENT ENTITY AND TERMINAL

(71) Applicant: CHINA ACADEMY OF TELECOMMUNICATIONS TECHNOLOGY, Beijing (CN)

(72) Inventor: Ming Ai, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/739,670

(22) PCT Filed: May 13, 2016

(86) PCT No.: PCT/CN2016/082063
§ 371 (c)(1),
(2) Date: Dec. 22, 2017

(87) PCT Pub. No.: WO2016/206495
PCT Pub. Date: Dec. 29, 2016

(65) Prior Publication Data
US 2018/0184398 A1    Jun. 28, 2018

(30) Foreign Application Priority Data
Jun. 26, 2015    (CN) .......................... 2015 1 0363479

(51) Int. Cl.
*H04W 68/02*    (2009.01)
*H04W 76/28*    (2018.01)
*H04W 52/02*    (2009.01)

(52) U.S. Cl.
CPC ....... *H04W 68/02* (2013.01); *H04W 52/0216* (2013.01); *H04W 52/0235* (2013.01); *H04W 76/28* (2018.02); *Y02D 30/70* (2020.08)

(58) Field of Classification Search
CPC ..... H04W 76/28; H04W 24/02; H04W 68/00; H04W 68/005; H04W 88/08; H04W 68/02; H04W 52/0216; H04W 52/0235
See application file for complete search history.

(56) References Cited

U.S. PATENT DOCUMENTS

2016/0112948 A1    4/2016    Liang et al.
2017/0374542 A1*    12/2017    Ryu .................. H04W 8/08

FOREIGN PATENT DOCUMENTS

CN    101064681 A    10/2007
CN    104105111 A    10/2014
(Continued)

OTHER PUBLICATIONS

3GPP 23770-100 ("3rd Generation Partnership Project; Technical Specification Group Services and System Aspects; Study on System Impacts of Extended DRX Cycle for Power Consumption Optimization (Release 13)", 3GPP Draft; 23770-100, 3RD Generation Partnership Project (3GPP), Mobile Competence 01 Centre ; 650, Route Des Lucioles ; F-06921 Sophiaantipo.*
(Continued)

*Primary Examiner* — George Eng
*Assistant Examiner* — Umair Ahsan
(74) *Attorney, Agent, or Firm* — Ladas & Parry, LLP (57) ABSTRACT

A paging method, an Mobile Management Entity (MME) and a terminal are provided, which relate to the field of communication technology, to reduce signaling overheard of the terminal and prevent the transmission of downlink data from being delayed. The paging method includes steps of: receiving downlink data for a target terminal; and in the case that the target terminal is in an idle state, adopts an extended DRX period and is capable of receiving a paging message, initiating a paging request to the target terminal based on the downlink data.

6 Claims, 5 Drawing Sheets

(56) References Cited

FOREIGN PATENT DOCUMENTS

| | | |
|---|---|---|
| CN | 104125612 A | 10/2014 |
| WO | 2014098663 A1 | 6/2014 |

OTHER PUBLICATIONS

From EPO Application No. 16813611.7, Extended European Search Report and Search Opinion dated May 7, 2018.
S2-152102: Ericsson, Intel, "Extended DRX in Idle"; SA WG2 Meeting #109; May 25-29, 2015; Fukuoka, Japan; pp. 1-6.
S2-151682: Qualcomm Incorporated, "Evaluation of paging strategy solutions for Idle mode Issue 2"; SA WG2 Meeting #109; May 25-29, 2015; Fukuoka, Japan; pp. 1-8.
S2-151605: Ericsson, "Evaluation of paging strategy solutions for Idle mode Issue 2"; SA WG2 Meeting #109; May 25-29, 2015; Fukuoka, Japan; pp. 1-4.
R2-152423: Ericsson, "eDRX concepts for idle and connected mode"; 3GPP TSG-RAN WG2 #90; May 25-29, 2015; Fukuoka, Japan; pp. 1-6.

International Search Report for PCT/CN2016/082063 dated Jul. 26, 2016, and its English translation provided by WIPO.
Written Opinion of the International Search Authority for PCT/CN2016/082063 dated Jul. 26, 2016, and its English translation provided by Bing.Com Microsoft Translate.
"Extended DRX in Idle". SA WG2 Meeting #109, Fukuoka, Japan, May 25-29, 2015.
From CN 201510363479.X, First Office Action dated Dec. 29, 2018, with machine English translation from Global Dossier.
From PCT/CN2016/082063, Written Opinion of the International Searching Authority, dated Jul. 26, 2016, with English translation from WIPO.
From PCT/CN2016/082063, International Preliminary Report on Patentability, dated Dec. 26, 2017, with English translation from WIPO.
Communication pursuant to Article 94(3) EPC, from EP app. No. 16813611.7, dated Aug. 6, 2019.
"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 13", 3GPP TS 23.401, v13.3.0 (Jun. 2015).

* cited by examiner

PAGING METHOD, MOBILE MANAGEMENT ENTITY AND TERMINAL

CROSS-REFERENCE TO RELATED APPLICATIONS

The present application is the U.S. national phase of PCT Application PCT/CN2016/082063 filed on May 13, 2016, which claims priority to the Chinese patent application No. 201510363479.X filed on Jun. 26, 2015, the disclosures of which are incorporated herein by reference in their entireties.

TECHNICAL FIELD

The present disclosure relates to the field of communication technology, in particular to a paging method, a Mobile Management Entity (MME) and a terminal.

BACKGROUND

Figure 1:
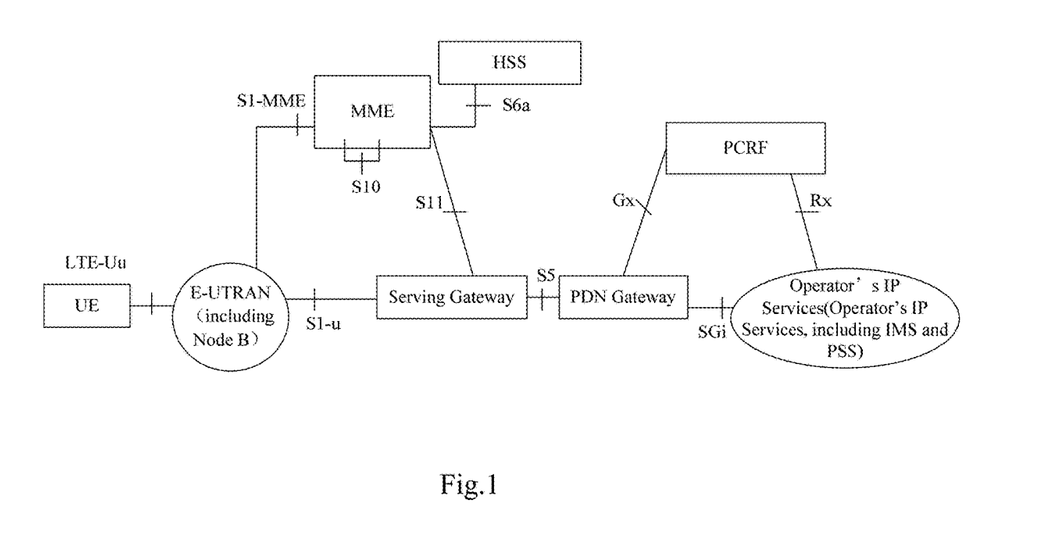
FIG. 1 is a schematic view showing a 3GPP system architecture in the related art.

FIG. 1 shows $3^{rd}$ Generation Partnership Projection (3GPP) system architecture. A terminal communicates with an MME via Evolved Universal Terrestrial Radio Access Network (E-UTRAN, which includes an evolved NodeB (eNB)), and the MME communicates with a Home Subscriber Server (HSS) and a Serving Gateway (SGW). The SGW is further connected to E-UTRAN and any other gateways at a network side, e.g., the SGW is connected to a Packet Data Network (PDN) gateway which is connected to a Policy and Charging Rules Function (PCRF) and an Operator's Internet Protocol (IP) Service connected to the PCRF.

In this system architecture, the terminal receives an air-interface paging message from the eNB of the E-UTRAN, and this air-interface paging message is triggered by a paging message issued by the MME to the eNB. In order to save electric power, such characteristics as a Discontinuous Reception (DRX) period in a power saving mode or in an extended state may be adopted by the terminal. The latter refers to that the terminal in an idle state may adopt an extended DRX period, which may be extended to be more than 10.24 seconds (i.e., a time length of a system frame). In the case that a common DRX period is adopted, the common DRX period is relatively short and one system frame includes a plurality of paging time windows, so the terminal may receive the paging message normally and respond to a network. In the case that the extended DRX period is adopted, it is impossible to know how long the terminal may respond to the paging message in the related art.

In the case that the terminal is in the idle state, there is no Radio Resource Control (RRC) connection or dedicated transmission resource for a user, so it is impossible to receive and transmit any data via the air interface. At this time, the air interface needs to be in a connected state through a paging process initiated by the network or a service request process initiated by the terminal, to transmit and receive the data. In the case that there is downlink data, e.g., in the case that Mobile Terminated Short Message Service (MT-SMS) from a Short Message Entity (e.g., SMS ROUTER) in message service architecture or a DOWNLINK DATA NOTIFICATION (DDN) message received by the MME from the SGW arrives, it is necessary for the MME to find a way to page the terminal. In addition, in the case that the MME cannot acquire a paging response from the terminal in time, it is necessary for the MME to find a way to notify a data source, which has transmitted the downlink data (e.g., the short message entity that has transmitted the MT-SMS), that the terminal is temporarily inaccessible. These problems lead to a certain time delay for the transmission of the service data.

However, in the related art, in the case that the terminal in the idle state adopts the common DRX period and the network fails to receive any paging response within a predetermined time period, usually 1 to 5 seconds, the network (e.g., the MME or a Mobile Switching Center (MSC)/Visitor Location Register (VLR)) may repeatedly transmit the paging message.

In the case that the terminal in the idle state adopts the extended DRX period and fails to respond to the paging message (i.e., the terminal fails to receive any paging message due to the adoption of the extended DRX period), the network (e.g., the MME or MSC/VLR) may also repeatedly transmit the paging message. Alternatively, in the case that the terminal may be paged (i.e., it may receive the paging message and respond to the network) within a relatively short time period after the MME has notified the data source, which has transmitted the downlink data, that the terminal is temporarily inaccessible (the MME may transmit the paging message after it has transmitted a notification to the data source), the transmission of the downlink data may be delayed or the unnecessary paging message may be transmitted.

SUMMARY

An object of the present disclosure is to provide a paging method, an MME and a terminal, to prevent the transmission of the downlink data from being delayed and optimize the transmission of the paging information in the case that the extended DRX period is adopted by the terminal in the idle state.

In one aspect, the present disclosure provides in some embodiments a paging method, including: receiving downlink data for a target terminal; and in the case that the target terminal is in an idle state, adopts an extended DRX period and is capable of receiving a paging message, initiating a paging request to the target terminal based on the downlink data.

Optionally, in the case that the target terminal is in the idle state, adopts the extended DRX period and is capable of receiving the paging message, initiating the paging request to the target terminal based on the downlink data includes: determining whether the target terminal is in the idle state, to acquire a first determination result; in the case that the first determination result indicates that the target terminal is in the idle state, determining whether the target terminal adopts the extended DRX period, to acquire a second determination result; in the case that the second determination result indicates that the target terminal adopts the extended DRX period, determining whether the target terminal is capable of receiving the paging message, to acquire a third determination result; and in the case that the third determination result indicates that the target terminal is capable of receiving the paging message, initiating the paging request to the target terminal based on the downlink data.

Optionally, the determining whether the target terminal is capable of receiving the paging message to acquire the third determination result includes: determining whether the target terminal is currently within a paging time window or the paging time window is to arrive after a predetermine time period; in the case that the target terminal is currently within the paging time window or the paging time window is to arrive after the predetermine time period, determining that the target terminal is capable of receiving the paging message; and in the case that the target terminal is currently not within the paging time window or the paging time window is not to arrive after the predetermine time period, determining that the target terminal is incapable of receiving the paging message. The predetermined time period is smaller than a common DRX period.

Optionally, whether the target terminal is currently within the paging time window is determined using an equation: $T_{PTW}=T_N \pm M \times T_{DRX}$, where $T_{PTW}$ represents the paging time window, $T_N$ represents a start time point of the extended DRX period, $T_{DRX}$ represents the common DRX period, and M is a positive integer. Whether or not the paging time window of the target terminal is to arrive after the predetermined time period is determined using an equation: $T_{eDRx}=T_{PTW}+$the predetermined time period, where $T_{eDRx}$ represents the extended DRX period of the target terminal.

Optionally, the downlink data includes an MT-SMS from a short message entity in a short message service architecture, or a paging request message transmitted by an MSC/VLR via an SGs interface, or a DNN from an SGW.

Optionally, in the case that the downlink data includes the MT-SMS from the short message entity in the short message service architecture or the paging request message transmitted by the MSC/VLR via the SGs interface, the paging method further includes, in the case that the target terminal is incapable of receiving the paging message, transmitting, to the short message entity or the MSC/VLR, a notification message indicating that the target terminal is temporarily inaccessible.

Optionally, in the case that the downlink data includes the DDN from the SGW, the paging method further includes: in the case that the target terminal is incapable of receiving the paging message, determining whether the target terminal has a characteristic of delayed reception; and in the case that the target terminal has the characteristic of delayed reception, transmitting a cache notification to the SGW to notify the SGW to cache data for the target terminal within the predetermined time period.

In another aspect, the present disclosure provides in some embodiments an MME, including: a reception module configured to receive downlink data for a target terminal; and a paging module configured to, in the case that the target terminal is in an idle state, adopts an extended DRX period and is capable of receiving a paging message, initiate a paging request to the target terminal based on the downlink data.

Optionally, the paging module includes: a first determination module configured to determine whether the target terminal is in the idle state, to acquire a first determination result; a second determination module configured to, in the case that the first determination result indicates that the target terminal is in the idle state, determine whether the target terminal adopts the extended DRX period, to acquire a second determination result; a third determination module configured to, in the case that the second determination result indicates that the target terminal has adopted the extended DRX period, determine whether the target terminal is capable of receiving the paging message, to acquire a third determination result; and a fourth determination module configured to, in the case that the third determination result indicates that the target terminal is capable of receiving the paging message, initiate the paging request to the target terminal based on the downlink data.

Optionally, the third determination module is further configured to: determine whether the target terminal is currently within a paging time window or the paging time window is to arrive after a predetermine time period; in the case that the target terminal is currently within the paging time window or the paging time window is to arrive after the predetermine time period, determine that the target terminal is capable of receiving the paging message; and in the case that the target terminal is currently not within the paging time window or the paging time window is not to arrive after the predetermine time period, determine that the target terminal is incapable of receiving the paging message. The predetermined time period is smaller than a common DRX period.

Optionally, the downlink data includes an MT-SMS from a short message entity in a short message service architecture, or a paging request message transmitted by an MSC/VLR via an SGs interface, or a DNN from an SGW.

Optionally, in the case that the downlink data includes the MT-SMS from the short message entity in the short message service architecture or the paging request message transmitted by the MSC/VLR via the SGs interface, the MME further includes a first transmission module configured to, in the case that the target terminal is incapable of receiving the paging message, transmit, to the short message entity or the MSC/VLR, a notification message indicating that the target terminal is temporarily inaccessible.

Optionally, in the case that the downlink data includes the DDN from the SGW, the MME further includes a second transmission module configured to, in the case that the target terminal is incapable of receiving the paging message, determine whether the target terminal has a characteristic of delayed reception, and in the case that the target terminal has the characteristic of delayed reception, transmit a cache notification to the SGW to notify the SGW to cache data for the target terminal within the predetermined time period.

In yet another aspect, the present disclosure provides in some embodiments an MME, including: a receiver configured to receive downlink data for a target terminal; and a processor configured to, in the case that the target terminal is in an idle state, adopts an extended DRX period and is capable of receiving a paging message, initiate a paging request to the target terminal based on the downlink data.

In still yet another aspect, the present disclosure provides in some embodiments a paging method, including: receiving a paging message from an MME, where the paging message is transmitted by the MME in the case that the MME receives downlink data for a target terminal and determines that the target terminal is in an idle state, adopts an extended DRX period and is capable of receiving a paging message; and receiving the downlink data from the MME based on the paging message.

In still yet another aspect, the present disclosure provides in some embodiments a terminal, including: a first reception module configured to receive a paging message from an MME, wherein the paging message is transmitted by the MME in the case that the MME received downlink data for a target terminal and determines that the target terminal is in an idle state, adopts an extended DRX period and is capable of receiving a paging message; and a second reception module configured to receive the downlink data from the MME based on the paging message.

In still yet another aspect, the present disclosure provides in some embodiments a terminal, including: a first receiver configured to receive a paging message from an MME, where the paging message is transmitted by the MME in the case that the MME receives downlink data for a target terminal and determines that the target terminal is in an idle state, adopts an extended DRX period and is capable of receiving a paging message; and a second receiver configured to receive the downlink data from the MME based on the paging message.

According to the embodiments of the present disclosure, the downlink data for the target terminal is acquired, and in the case that the target terminal is in the idle state, adopts the extended DRX period and is capable of receiving the paging message, the network initiates a paging request to the target terminal based on the downlink data. As a result, it is able for the terminal in the idle state and adopting the extended DRX period to receive the paging message in time, thereby to prevent the transmission of the downlink data from being delayed, optimize the transmission of the paging message, and reduce unnecessary signaling overhead.

DETAILED DESCRIPTION OF THE EMBODIMENTS

In order to make the objects, the technical solutions and the advantages of the present disclosure more apparent, the present disclosure will be described hereinafter in more details in conjunction with the drawings and embodiments.

In the related art, a terminal in an idle state adopts an extended DRX period, and in the case that the terminal cannot be paged within the extended DRX period, an MME may continuously page the terminal. In addition, in the case that terminal is paged again within a relatively short time period after the MME has notified a data source, which has transmitted downlink data, that the terminal is temporarily inaccessible, the transmission of the downlink data may be delayed. In order to solve these problems, the present disclosure provides in some embodiments a paging method.

First Embodiment

Figure 2:
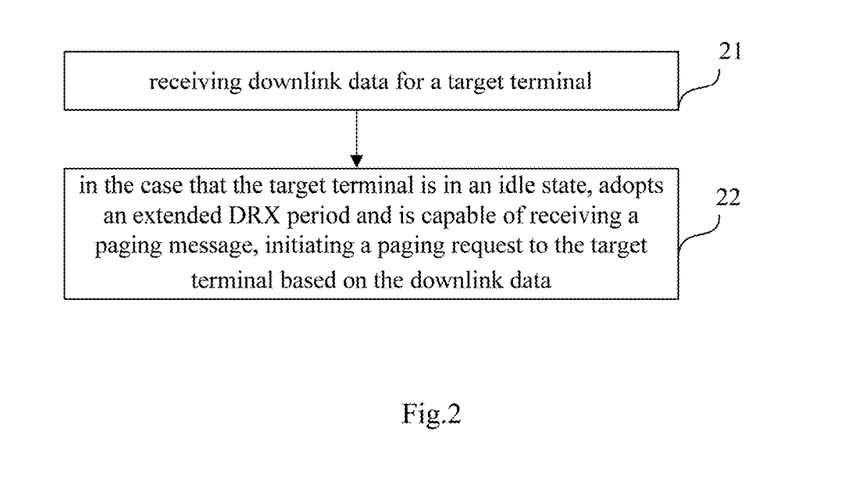
FIG. 2 is a flow chart of a paging method in some embodiments of the present disclosure.

The present disclosure provides in this embodiment a paging method which, as shown in FIG. 2, includes: Step 21 of receiving downlink data with respect to a target terminal; and Step 22 of, in the case that the target terminal is in an idle state, adopts an extended DRX period and is capable of receiving a paging message, initiating a paging request to the target terminal based on the downlink data.

According to the embodiment of the present disclosure, the paging request may be initiated for the target terminal, i.e., the paging message may be transmitted to the target terminal, based on the downlink data only in the case that the terminal in the idle state adopts the extended DRX period and is capable of receiving the paging message. The so-called "capable of receiving the paging message" refers to that the terminal is within a time window capable of receiving the paging message, and the so-called "incapable of receiving the paging message" refers to that the terminal is not within the time window capable of receiving the paging message, or the terminal is within a time window incapable of receiving the paging message, e.g., a time period of the extended DRX period where no radio signal can be received. In the case that the target terminal is incapable of receiving the paging message, the paging request may not be initiated, i.e., no paging message may be transmitted. As a result, it is able for the terminal in the idle state and adopting the extended DRX period to receive the paging message in time, thereby to prevent the transmission of the downlink data from being delayed, optimize the transmission of the paging message, and reduce unnecessary signaling overhead.

Second Embodiment

The present disclosure further provides in this embodiment a paging method, which includes: Step 211 of receiving downlink data for a target terminal, the downlink data including an MT-SMS from a short message entity of short message service architecture or a paging request message from an MSC/VLR via an SGs interface; Step 221 of determining whether the target terminal is in the idle state, to acquire a first determination result; Step 222 of, in the case that the first determination result indicates that the target terminal is in the idle state, determining whether the target terminal has adopted the extended DRX period, to acquire a second determination result; Step 223 of, in the case that the second determination result indicates that the target terminal has adopted the extended DRX period, determining whether the target terminal is capable of receiving the paging message, to acquire a third determination result; Step 224 of, in the case that the third determination result indicates that the target terminal is capable of receiving the paging message, initiating the paging request to the target terminal based on the downlink data; and Step 225 of, in the case that the target terminal is incapable of receiving the paging message, transmitting, to the short message entity or the MSC/VLR, a notification message indicating that the target terminal is temporarily inaccessible.

In the second embodiment of the present disclosure, the so-called "capable of receiving the paging message" refers to that the terminal is within a time window capable of receiving the paging message, and the so-called "incapable of receiving the paging message" refers to that the terminal is not within the time window capable of receiving the paging message, or the terminal is within a time window incapable of receiving the paging message, e.g., a time period of the extended DRX period where no radio signal can be received. In the case that no paging message can be received, the paging request may not be initiated, i.e., no paging message may be transmitted.

Figure 3:
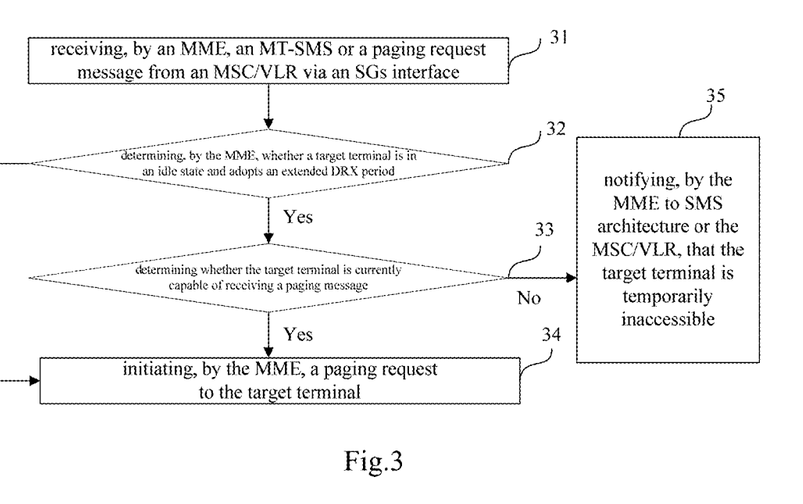
FIG. 3 is a flow chart of the paging method in the case that downlink data received by an MME includes an MT-SMS or a paging request message from an SGs interface in some embodiments of the present disclosure.
Figure 4:
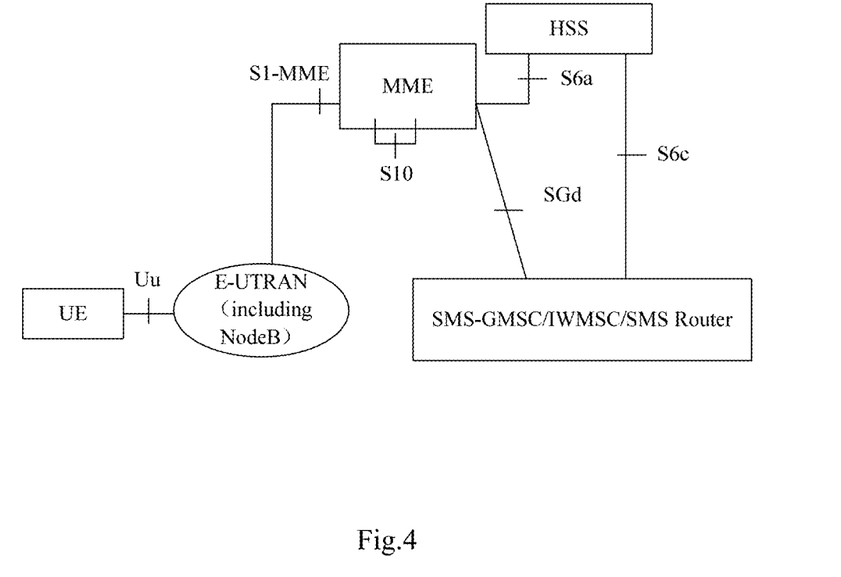
FIG. 4 is a schematic view showing system architecture in the case that the downlink data received by the MME includes the MT-SMS in some embodiments of the present disclosure.
Figure 5:
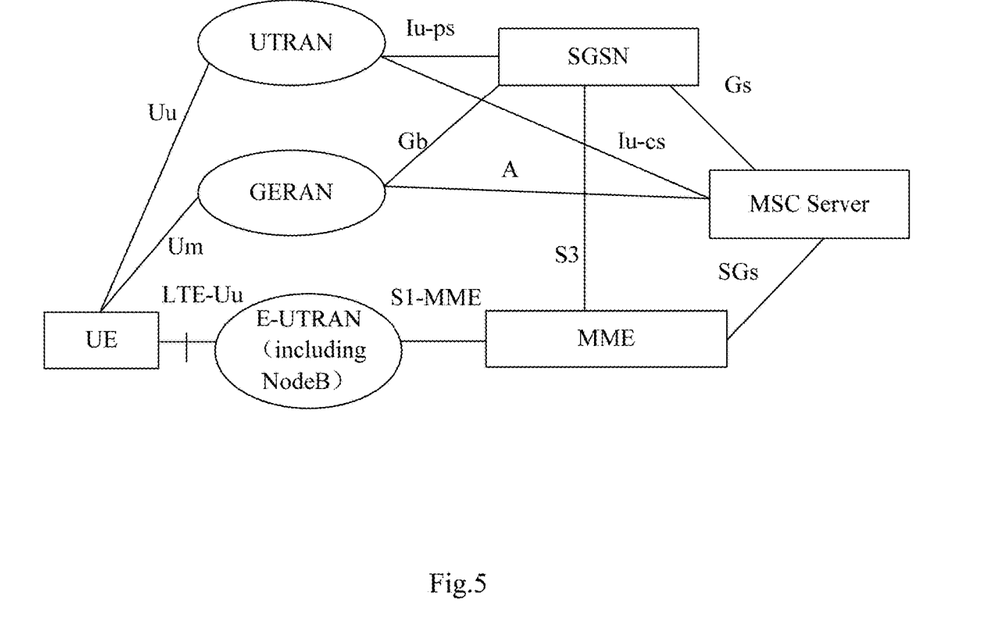
FIG. 5 is a schematic view showing system architecture in the case that the downlink data received by the MEE includes the paging request message from the SGs interface in some embodiments of the present disclosure.

The paging method in the second embodiment will be described hereinafter in conjunction with the flows and system architecture in FIGS. 3-5. As shown in FIG. 3, the paging method may include the following steps. Step 31: receiving, by the MME, the MT-SMS or the paging request message from the MSC/VLR via the SGs interface. Step 32: determining, by the MME, whether the target terminal is in the idle state and adopts the extended DRX period, in the case that the target terminal is in the idle state and adopts the extended DRX period, proceeding to Step 33, and otherwise proceeding to Step 34. Step 33: determining, by the MME, whether the target terminal is capable of receiving the paging message, in the case that the target terminal is capable of receiving the paging message, proceeding to Step 34, and otherwise, proceeding to Step 35. Step 34: initiating, by the MEE, the paging request to the target terminal. Step 35: notifying, by the MME to the short message entity or the MSC/VLR, that the target terminal is temporarily inaccessible.

According to the second embodiment of the present disclosure, the network may initiate the paging request to the target terminal based on the MT-SMS or the paging request message from the MSC/VLR via the SGs interface only in the case that the target terminal in the idle state and adopting the extended DRX period is capable of receiving the paging message. As a result, it is able for the terminal in the idle state and adopting the extended DRX period to receive the paging message in time, thereby to reduce the unnecessary signaling overhead and prevent the transmission of the MT-SMS or the paging request message from being delayed.

Third Embodiment

The present disclosure provides in this embodiment a paging method which includes: Step 311 of receiving downlink data for a target terminal, the downlink data including a DNN from an SGW; Step 321 of determining whether the target terminal is in the idle state, to acquire a first determination result; Step 322 of, in the case that the first determination result indicates that the target terminal is in the idle state, determining whether the target terminal has adopted the extended DRX period, to acquire a second determination result; Step 323 of, in the case that the second determination result indicates that the target terminal has adopted the extended DRX period, determining whether the target terminal is capable of receiving the paging message, to acquire a third determination result; Step 324 of, in the case that the third determination result indicates that the target terminal is capable of receiving the paging message, initiating the paging request to the target terminal based on the downlink data; and Step 325 of, in the case that the target terminal is incapable of receiving the paging message, determining whether the target terminal has a characteristic of delayed reception, and in the case that the target terminal has a characteristic of delayed reception, transmitting a cache notification to the SGW to notify the SGW to cache data for the target terminal within the predetermined time period.

In the third embodiment of the present disclosure, the so-called "capable of receiving the paging message" refers to that the terminal is within a time window capable of receiving the paging message, and the so-called "incapable of receiving the paging message" refers to that the terminal is not within the time window capable of receiving the paging message, or the terminal is within a time window incapable of receiving the paging message, e.g., a time period of the extended DRX period where no radio signal can be received. In the case that no paging message can be received, the paging request may not be initiated, i.e., no paging message may be transmitted.

Figure 6:
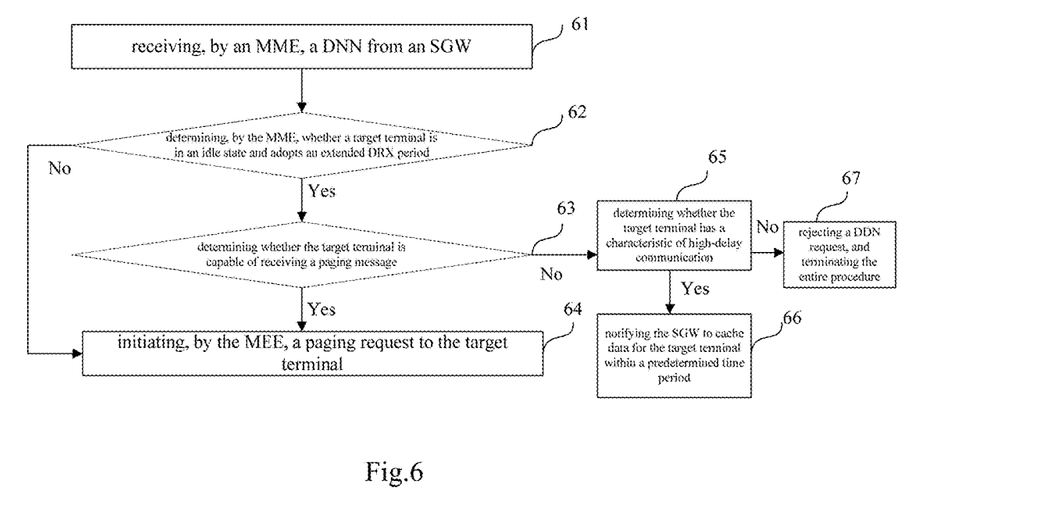
FIG. 6 is another flow chart of the paging method in the case that the downlink data received by the MME includes a DDN from an SGW in some embodiments of the present disclosure.
Figure 7:
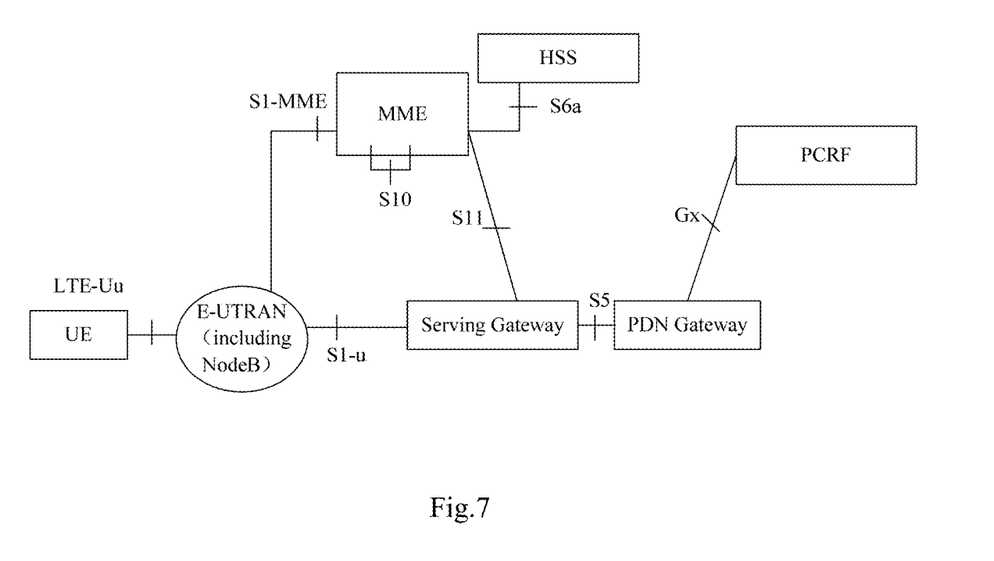
FIG. 7 is a schematic view showing system architecture in the case that the downlink data received by the MME includes the DDN from the SGW in some embodiments of the present disclosure.

The paging method in the second embodiment will be described hereinafter in conjunction with the flows and system architecture in FIGS. 6 and 7. As shown in FIG. 6, the paging method may include the following steps. Step 61: receiving, by the MME, the DNN from the SGW. Step 62: determining, by the MME, whether the target terminal is in the idle state and adopts the extended DRX period, in the case that the target terminal is in the idle state and adopts the extended DRX period, proceeding to Step 63, and otherwise proceeding to Step 64. Step 63: determining, by the MME, whether the target terminal is capable of receiving the paging message within the current extended DRX period, in the case that the target terminal is capable of receiving the paging message within the current extended DRX period, proceeding to Step 64, and otherwise, proceeding to Step 65. Step 64: initiating, by the MEE, the paging request to the target terminal. Step 65: determining, by the MME, whether the target terminal has a characteristic of high-delay communication, in the case that the target terminal has the characteristic of high-delay communication, proceeding to Step 66, and otherwise, proceeding to Step 67. Step 66: notifying the SGW to cache data for the target terminal within the predetermined time period. Step 67: rejecting a DDN request, and terminating the entire procedure.

According to the third embodiment of the present disclosure, the network may initiate the paging request to the target terminal based on the DDN only in the case that the target terminal in the idle state and adopting the extended DRX period is capable of receiving the paging message. As a result, it is able for the terminal in the idle state and adopting the extended DRX period to receive the paging message in time, thereby to reduce the unnecessary signaling overhead and prevent the transmission of the DDN from being delayed.

In the above-mentioned Step 223 in the second embodiment and Step 323 in the third embodiment, the step of determining whether the target terminal is capable of receiving the paging message to acquire the third determination result includes: determining whether the target terminal is currently within a paging time window or the paging time window is to arrive after a predetermine time period; in the case that the target terminal is currently within the paging time window in the extended DRX period or the paging time window is to arrive after the predetermine time period, determining that the target terminal is capable of receiving the paging message; and in the case that the target terminal is currently not within the paging time window or the paging time window is not to arrive after the predetermine time period, determining that the target terminal is incapable of receiving the paging message. The predetermined time period is smaller than a common DRX period.

The determination of whether or not the target terminal is currently within the paging time window or the paging time window is to arrive after the predetermined time period may be performed using a method identical to a method for synchronizing the paging time window of the terminal with a paging time window of the MME, or by the MME locally, i.e., the MME may determine whether the target terminal is capable of receiving the paging message.

Figure 8:
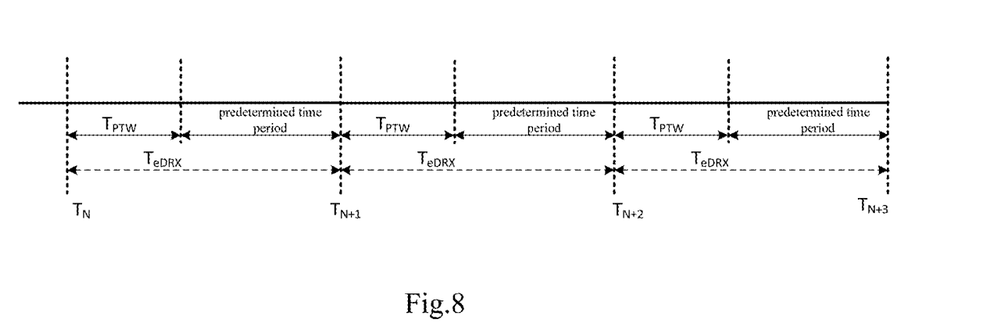
FIG. 8 is a schematic view showing a relationship among an extended DRX period of a terminal, a paging time window and a DRX period of the terminal in some embodiments of the present disclosure.

During the synchronization of the paging time window of the target terminal and the paging time window of the MME, as shown in FIG. 8, there is the following relationship between the extended DRX period ($T_{eDRx}$) and the paging time window ($T_{PTW}$) of the target terminal: $T_{eDRx}=T_{PTW}+$the predetermined time period, where $T_{eDRx}$ represents the extended DRX period, and $T_{PTW}$ represents the paging time window. There is the following relationship between the paging time window ($T_{PTW}$) and a common DRX period ($T_{DRX}$): $T_{PTW}=T_N+M\times T_{DRX}$, where $T_N$ represents a start time point of the extended DRX period, $T_{DRX}$ represents the common DRX period adopted by the target terminal, and M is a positive integer.

In other words, within the extended DRX period of the target terminal, the target terminal may receive the paging message from the network in the paging time window consisting of previous one or more common DRX periods (i.e., it may receive the paging message normally like in the related art). Within the predetermined time period after the paging time window, the target terminal cannot receive the paging message from the network.

Hence, the MME may determine, based on the relationship between the extended DRX period and the paging time window, whether the target terminal is currently within the paging time window in the extended DRX period or the paging time window is to arrive after the predetermined time period.

$T_N$ of the target terminal may be synchronized with $T_N$ of the MME through a non-access stratum (NAS) procedure, and this NAS procedure includes an attachment procedure, a Tracking Area Update (TAU) procedure or an S1 interface release procedure.

For example, in the case that the target terminal has received an Attach Accept message from the MME at a certain time point, this time point may be deemed as $T_N$.

In the above embodiments of the present disclosure, in the case that the MME determines that the target terminal is currently incapable of receiving the paging message (i.e., the MME determines that the target terminal cannot receive the paging message even in the case that the paging message is transmitted by the MME), the MME may not transmit the paging message or not trigger a paging process. Next, the MME may calculate a time point at which the target terminal is to be capable of receiving the paging message or how long it takes for the target terminal to be capable of receiving the paging message, and then notify the time to the short message service architecture, MSC/VLR or SGW. In this way, in the case that the target terminal is capable of being paged, the short message service architecture, MSC/VLR or SGW may transmit the downlink data, to prevent the paging signaling from being transmitted unnecessarily and prevent the transmission of the downlink data from being delayed.

In addition, in the above-mentioned embodiments of the present disclosure, an MT service may be of an MT-SMS type. An SGs-PAGING message at an SGs interface may be trigger by the MT-SMS arriving at the MSC/VLR. This method may also be applied to the other types of the MT service, e.g., the SGs-PAGING Message may be triggered by an MT-Location Request (LR) received by the MSC/VLR.

Fourth Embodiment

Figure 9:
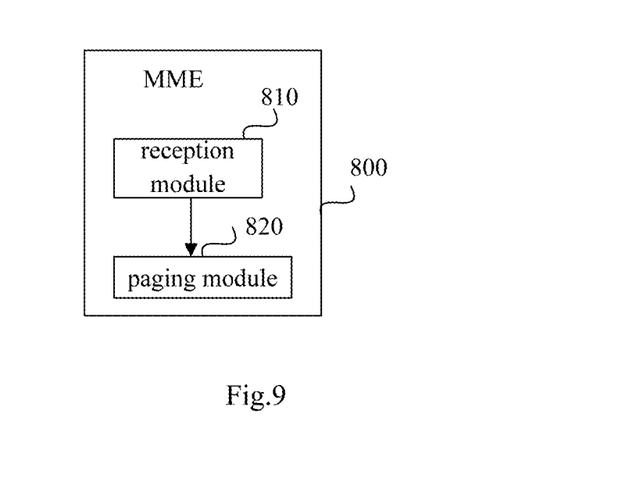
FIG. 9 is a schematic view showing the MME in some embodiments of the present disclosure.

Corresponding to the above-mentioned method, as shown in FIG. 9, the present disclosure further provides in this embodiment an MME 800, which includes: a reception module 810 configured to receive downlink data for a target terminal; and a paging module 820 configured to, in the case that the target terminal is in an idle state, adopts an extended DRX period and is capable of receiving a paging message, initiate a paging request to the target terminal based on the downlink data.

According to the fourth embodiment of the present disclosure, the paging request is initiated for the target terminal only in the case that the target terminal in the idle state adopts the extended DRX period and is capable of receiving the paging message. As a result, it is able for the terminal in the idle state and adopting the extended DRX period to receive the paging message in time, thereby to prevent the transmission of the downlink data from being delayed, optimize the transmission of the paging message, and reduce unnecessary signaling overhead.

In a possible embodiment of the present disclosure, the paging module 820 includes: a first determination module configured to determine whether the target terminal is in the idle state, to acquire a first determination result; a second determination module configured to, in the case that the first determination result indicates that the target terminal is in the idle state, determine whether the target terminal has adopted the extended DRX period, to acquire a second determination result; a third determination module configured to, in the case that the second determination result indicates that the target terminal has adopted the extended DRX period, determine whether the target terminal is capable of receiving the paging message, to acquire a third determination result; and a fourth determination module configured to, in the case that the third determination result indicates that the target terminal is capable of receiving the paging message, initiate the paging request to the target terminal based on the downlink data.

The third determination module is further configured to: determine whether the target terminal is currently within a paging time window or the paging time window is to arrive after a predetermine time period; in the case that the target terminal is currently within the paging time window or the paging time window is to arrive after the predetermine time period, determine that the target terminal is capable of receiving the paging message; and in the case that the target terminal is currently not within the paging time window or the paging time window is not to arrive after the predetermine time period, determine that the target terminal is incapable of receiving the paging message. The predetermined time period is smaller than a common DRX period.

To be specific, whether the target terminal is currently within the paging time window may be determined using an equation: $T_{PTW}=T_N+M\times T_{DRX}$, where $T_{PTW}$ represents the paging time window, $T_N$ represents a start time point of the extended DRX period, $T_{DRX}$ represents the common DRX period, and M is a positive integer.

Further, whether the paging time window of the target terminal is to arrive after the predetermined time period may be determined using an equation: $T_{eDRx}=T_{PTW}+$the predetermined time period, where $T_{eDRx}$ represents the extended DRX period of the target terminal.

Optionally, the downlink data received by the MME includes an MT-SMS from a short message entity in a short message service architecture, a paging request message transmitted by an MSC/VLR via an SGs interface, or a DNN from an SGW.

Optionally, in the case that the downlink data includes the MT-SMS from the short message entity in the short message service architecture or the paging request message transmitted by the MSC/VLR via the SGs interface, the MME further includes a first transmission module configured to, in the case that the target terminal is incapable of receiving the paging message, transmit, to the short message entity or the MSC/VLR, a notification message indicating that the target terminal is temporarily inaccessible.

Optionally, in the case that the downlink data includes the DDN from the SGW, the MME further includes a second transmission module configured to: in the case that the target terminal is incapable of receiving the paging message, determine whether the target terminal has a characteristic of delayed reception; and in the case that the target terminal has the characteristic of delayed reception, transmit a cache notification to the SGW to notify the SGW to cache data for the target terminal within the predetermined time period.

The MME in some embodiments of the present disclosure may be an MME in a network supporting an E-UTRAN, or a Service General Packet Radio Service (GPRS) Supporting Node (SGSN) capable of achieving a mobile management function in a network supporting a UTRAN, a Global System for Mobile Communications (GSM) Edge Radio Access Network (GERAN), or any other entities capable of achieving the mobile management function in the network.

Fifth Embodiment

Figure 10:
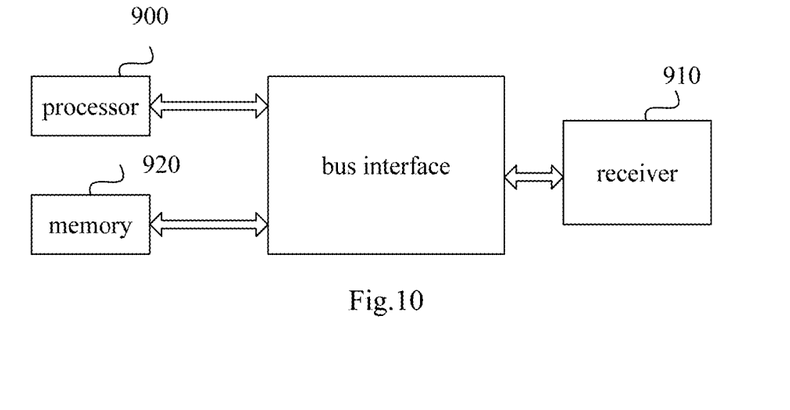
FIG. 10 is another schematic view showing the MME in some embodiments of the present disclosure.

As shown in FIG. 10, the present disclosure provides in this embodiment an MME which includes: a receiver 910 configured to receive downlink data for a target terminal; and a processor 900 configured to, in the case that the target terminal is in an idle state, adopts an extended DRX period and is capable of receiving a paging message, initiate a paging request to the target terminal based on the downlink data.

The MME may further includes a memory 920 configured to store therein the downlink data or any other paging-related data.

The processor 900 and the memory 920 may be connected to the receiver 910 via a bus interface. Bus architecture may include a number of buses and bridges connected to each other, to connect various circuits for one or more processors 900 and one or more memories 920. In addition, as is known in the art, the bus architecture may be used to connect any other circuits, such as a circuit for a peripheral device, a circuit for a voltage stabilizer and a power management circuit.

Bus interfaces are provided, and the transceiver 910 may consist of a plurality of elements, i.e., a transmitter and a receiver for communication with any other devices over a transmission medium. The processor 900 may take charge of managing the bus architecture as well as general processing. The memory 920 may store data desired for the operation of the processor 900.

Sixth Embodiment

The present disclosure provides in this embodiment a paging method, which includes: Step 101 of receiving a paging message from an MME, the paging message being transmitted by the MME after the MME has received downlink data for a target terminal and determined that the target terminal is in an idle state, adopts an extended DRX period and is capable of receiving a paging message; and Step 102 of receiving the downlink data from the MME based on the paging message.

All the features about the target terminal in the first to fifth embodiments may also be applied to this embodiment, with an identical technical effect.

Seventh Embodiment

Figure 11:
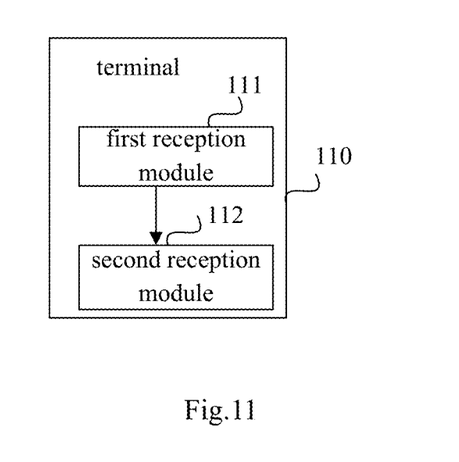
FIG. 11 is a schematic view showing the terminal in some embodiments of the present disclosure.

As shown in FIG. 11, the present disclosure provides in this embodiment a terminal 110 which includes: a first reception module 111 configured to receive a paging message from an MME, the paging message being transmitted by the MME after the MME has received downlink data for a target terminal and determined that the target terminal is in an idle state, adopts an extended DRX period and is capable of receiving a paging message; and a second reception module 112 configured to receive the downlink data from the MME based on the paging message.

Eighth Embodiment

Figure 12:
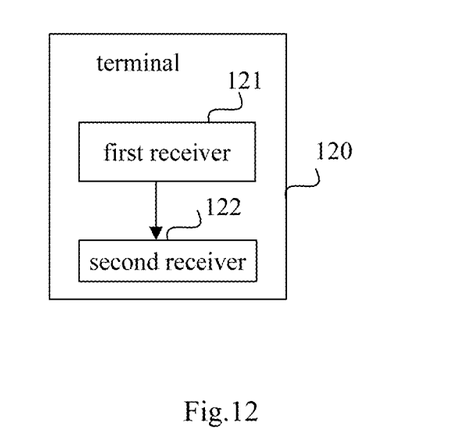
FIG. 12 is another schematic view showing the terminal in some embodiments of the present disclosure.

As shown in FIG. 12, the present disclosure further provides in this embodiment a terminal 120 which may include: a first receiver 121 configured to receive a paging message from an MME, the paging message being transmitted by the MME after the MME has received downlink data for a target terminal and determined that the target terminal is in an idle state, adopts an extended DRX period and is capable of receiving a paging message; and a second receiver 122 configured to receive the downlink data from the MME based on the paging message.

During the implementation, the first receiver 121 and the second receiver 122 may be one receiver or two separate receivers, and they may be in communication with the MME.

It should be appreciated that, all or parts of the steps in the embodiments of the present disclosure may be implemented by hardware, or by software including a computer program. The computer program includes instructions capable of executing parts or all of the above-mentioned steps, and it may be stored in a computer-readable medium in any form.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A paging method, comprising:
   receiving downlink data for a target terminal; and
   initiating, in the case that the target terminal is in an idle state, adopts an extended Discontinuous Reception (DRX) period and is capable of receiving a paging message, a paging request to the target terminal based on the downlink data;
   not sending a paging message or triggering a paging process in the case that the target terminal is incapable of receiving a paging message;
   wherein the downlink data comprises a Mobile Terminated Short Message Service (MT-SMS) from a short message entity in a short message service architecture, or a paging request message transmitted by a Mobile Switching Center (MSC)/Visitor Location Register (VLR) via an SGs interface, or a Downlink Data Notification (DDN) from a Serving Gateway (SGW);
   in the case that the downlink data comprises the paging request message transmitted by the MSC/VLR via the SGs interface, the paging method further comprises: in the case that the target terminal is incapable of receiving the paging message, transmitting, to the MSC/VLR, a notification message indicating that the target terminal is temporarily inaccessible;

in the case that the downlink data comprises the DDN from the SGW, the paging method further comprises: in the case that the target terminal is incapable of receiving the paging message, determining whether the target terminal has a characteristic of delayed reception; and in the case that the target terminal has the characteristic of delayed reception, transmitting a cache notification to the SGW to notify the SGW to cache data for the target terminal within a predetermined time period;

wherein the initiating, in the case that the target terminal is in the idle state, adopts the extended DRX period and is capable of receiving the paging message, the paging request to the target terminal based on the downlink data comprises:

determining whether the target terminal is in the idle state, to acquire a first determination result;

in the case that the first determination result indicates that the target terminal is in the idle state, determining whether the target terminal adopts the extended DRX period, to acquire a second determination result;

in the case that the second determination result indicates that the target terminal adopts the extended DRX period, determining whether the target terminal is capable of receiving the paging message, to acquire a third determination result; and in the case that the third determination result indicates that the target terminal is capable of receiving the paging message, initiating the paging request to the target terminal based on the downlink data;

wherein the determining whether the target terminal is capable of receiving the paging message to acquire the third determination result comprises:

determining whether the target terminal is currently within a paging time window or the paging time window is to arrive after the predetermined time period;

in the case that the target terminal is currently within the paging time window, determining that the target terminal is capable of receiving the paging message;

in the case that the paging time window is to arrive after the predetermined time period, determining that the target terminal is capable of receiving the paging message; and in the case that the target terminal is currently not within the paging time window or the paging time window is not to arrive after the predetermined time period, determining that the target terminal is incapable of receiving the paging message, wherein the predetermined time period is smaller than a common DRX period;

wherein the paging method further comprises: determining, through an equation: $T_{PTW}=T_N+M \times T_{DRX}$, whether the target terminal is currently within the paging time window, wherein $T_{PTW}$ represents the paging time window, $T_N$ represents a start time point of the extended DRX period, $T_{DRX}$ represents the common DRX period, and M is a positive integer; and determining, through an equation: $T_{eDRX}-T_{PTW}+$the predetermined time period, whether the paging time window of the target terminal is to arrive after the predetermined time period, wherein $T_{eDRX}$ represents the extended DRX period of the target terminal.

2. The paging method according to claim 1, wherein in the case that the downlink data comprises the MT-SMS from the short message entity in the short message service architecture the paging method further comprises: in the case that the target terminal is incapable of receiving the paging message, transmitting, to the short message entity, a notification message indicating that the target terminal is temporarily inaccessible.

3. The paging method according to claim 1, wherein $T_N$ of the target terminal is synchronized with $T_N$ of an MME through a Non-Access Stratum (NAS) procedure, the NAS procedure comprises an attachment procedure, a Tracking Area Update (TAU) procedure or an S1 interface release procedure.

4. A Mobile Management Entity (MME), comprising:
a processor;
a memory connected to the processor via a bus interface and configured to store therein programs and data for the operation of the processor; and
a transceiver configured to communicate with any other device over a transmission medium,
wherein the processor is configured to call and execute the programs and data stored in the memory, to:
receive downlink data for a target terminal; and
in the case that the target terminal is in an idle state, adopts an extended Discontinuous Reception (DRX) period and is capable of receiving a paging message, initiate a paging request to the target terminal based on the downlink data;
not send a paging message or trigger a paging process in the case that the target terminal is incapable of receiving a paging message;
wherein the downlink data comprises a Mobile Terminated Short Message Service (MT-SMS) from a short message entity in a short message service architecture, or a paging request message transmitted by a Mobile Switching Center (MSC)/Visitor Location Register (VLR) via an SGs interface, or a Downlink Data Notification (DDN) from a Serving Gateway (SGW);
in the case that the downlink data comprises the paging request message transmitted by the MSC/VLR via the SGs interface, the processor is further configured to call and execute the programs and data stored in the memory, to:
in the case that the target terminal is incapable of receiving the paging message, transmit, to the MSC/VLR, a notification message indicating that the target terminal is temporarily inaccessible;
in the case that the downlink data comprises the DDN from the SGW, the processor is further configured to call and execute the programs and data stored in the memory to:
in the case that the target terminal is incapable of receiving the paging message, determine whether the target terminal has a characteristic of delayed reception, and in the case that the target terminal has the characteristic of delayed reception, transmit a cache notification to the SGW to notify the SGW to cache data for the target terminal within a predetermined time period;
wherein the processor is further configured to call and execute the programs and data stored in the memory, to
determine whether the target terminal is in the idle state, to acquire a first determination result;
in the case that the first determination result indicates that the target terminal is in the idle state, determine whether the target terminal adopts the extended DRX period, to acquire a second determination result;

in the case that the second determination result indicates that the target terminal adopts the extended DRX period, determine whether the target terminal is capable of receiving the paging message, to acquire a third determination result; and in the case that the third determination result indicates that the target terminal is capable of receiving the paging message, initiate the paging request to the target terminal based on the downlink data;

wherein the processor is further configured to call and execute the programs and data stored in the memory, to:

determine whether the target terminal is currently within a paging time window or the paging time window is to arrive after the predetermined time period;

in the case that the target terminal is currently within the paging time window, determine that the target terminal is capable of receiving the paging message;

in the case that the paging time window is to arrive after the predetermined time period, determine that the target terminal is capable of receiving the paging message; and in the case that the target terminal is currently not within the paging time window or the paging time window is not to arrive after the predetermined time period, determine that the target terminal is incapable of receiving the paging message, wherein the predetermined time period is smaller than a common DRX period;

wherein the processor is further configured to call and execute the programs and data stored in the memory, to:

determine, through an equation: $T_{PTW}=T_N+M \times T_{DRX}$, whether the target terminal is currently within the paging time window, wherein $T_{PTW}$ represents the paging time window, $T_N$ represents a start time point of the extended DRX period, $T_{DRX}$ represents the common DRX period, and M is a positive integer; and determine, through an equation: $T_{eDRX}=T_{PTW}+$the predetermined time period, whether the paging time window of the target terminal is to arrive after the predetermined time period, wherein $T_{eDRX}$ represents the extended DRX period of the target terminal.

5. The MME according to claim 4, wherein the downlink data comprises the MT-SMS from the short message entity in the short message service architecture, the processor is further configured to call and execute the programs and data stored in the memory to, in the case that the target terminal is incapable of receiving the paging message, transmit, to the short message entity, a notification message indicating that the target terminal is temporarily inaccessible.

6. The MME according to claim 4, wherein $T_N$ of the target terminal is synchronized with $T_N$ of an MME through a Non-Access Stratum (NAS) procedure, the NAS procedure comprises an attachment procedure, a Tracking Area Update (TAU) procedure or an S1 interface release procedure.

* * * * *